US010830399B2

(12) United States Patent
Dussaume et al.

(10) Patent No.: US 10,830,399 B2
(45) Date of Patent: Nov. 10, 2020

(54) DEVICE FOR LIGHTING AND OPTICAL COMMUNICATION COMBINED WITH VIEWING OF THE COMMUNICATION FIELD

(71) Applicant: Orange, Paris (FR)

(72) Inventors: Philippe Dussaume, Châtillon (FR); Micheline Perrufel, Châtillon (FR); Christophe Cutullic, Châtillon (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/464,536

(22) PCT Filed: Nov. 20, 2017

(86) PCT No.: PCT/FR2017/053179
§ 371 (c)(1),
(2) Date: May 28, 2019

(87) PCT Pub. No.: WO2018/100266
PCT Pub. Date: Jun. 7, 2018

(65) Prior Publication Data
US 2019/0376653 A1 Dec. 12, 2019

(30) Foreign Application Priority Data

Nov. 29, 2016 (FR) ..................... 16 61655

(51) Int. Cl.
H04B 10/04 (2006.01)
F21K 9/69 (2016.01)
(Continued)

(52) U.S. Cl.
CPC ............... F21K 9/69 (2016.08); F21V 5/007 (2013.01); F21V 23/003 (2013.01);
(Continued)

(58) Field of Classification Search
CPC ....................................................... F21V 5/007
See application file for complete search history.

(56) References Cited

U.S. PATENT DOCUMENTS 7,663,501 B2 * 2/2010 Hyun ................ H04M 1/72519
340/12.54
9,720,639 B1 * 8/2017 Morgan ................ G06F 3/1454
(Continued)

FOREIGN PATENT DOCUMENTS

EP 3073650 7/2018
WO WO 2005/108853 11/2005
(Continued)

OTHER PUBLICATIONS

International Search Report and Written Opinion dated Jan. 19, 2018 for Application No. PCT/FR2017/053179.

Primary Examiner — David C Payne
Assistant Examiner — Pranesh K Barua
(74) Attorney, Agent, or Firm — Knobbe, Martens, Olson & Bear, LLP

(57) ABSTRACT

A lighting device includes at least one first fixed light source dedicated to lighting, at least one second light source dedicated to data transmission by light modulation, and first and second refractor optical devices positioned respectively with respect to the first and second light sources, so as to sense the light emitted by said sources and form respectively first and second distinct light beams, said second light beam delimiting a data transmission zone. The lighting device also includes a variator of the brightness and/or the color of the first light beam, which is accentuates or decreases the visibility of the data transmission zone delimited by said second light beam, according to the availability or the unavailability respectively of the data transmission service in the data transmission zone.

10 Claims, 12 Drawing Sheets

(51) Int. Cl.
*F21V 5/00* (2018.01)
*F21V 23/00* (2015.01)
*H04B 10/116* (2013.01)
*H04B 10/50* (2013.01)
*H04B 10/516* (2013.01)
*F21Y 115/10* (2016.01)

(52) U.S. Cl.
CPC ......... *H04B 10/116* (2013.01); *H04B 10/502* (2013.01); *H04B 10/516* (2013.01); *F21Y 2115/10* (2016.08)

(56) References Cited

U.S. PATENT DOCUMENTS

| | | | | |
|---|---|---|---|---|
| 2002/0051364 | A1* | 5/2002 | Ishikawa | B60Q 1/115 362/466 |
| 2005/0243552 | A1* | 11/2005 | Maxik | F21V 3/04 362/249.01 |
| 2007/0280694 | A1* | 12/2007 | Yasumoto | H04B 10/1149 398/119 |
| 2008/0215391 | A1* | 9/2008 | Dowling | G06Q 30/0201 705/7.29 |
| 2009/0297166 | A1* | 12/2009 | Nakagawa | G09F 9/33 398/172 |
| 2012/0121244 | A1* | 5/2012 | Stavely | F21V 5/007 396/175 |
| 2012/0128366 | A1* | 5/2012 | Lee | H04B 10/1121 398/118 |
| 2014/0140703 | A1* | 5/2014 | Sako | H04B 10/114 398/115 |
| 2014/0153422 | A1* | 6/2014 | Nambiar | H04L 47/122 370/252 |
| 2014/0254154 | A1 | 9/2014 | Catalano | |
| 2014/0301071 | A1* | 10/2014 | Jorgensen | F21V 14/06 362/231 |
| 2016/0352597 | A1* | 12/2016 | Mekkattuparamban | H04L 43/0876 |
| 2017/0104532 | A1* | 4/2017 | Stout | H04B 10/1149 |
| 2018/0219624 | A1* | 8/2018 | Tsang | H04B 10/1141 |

FOREIGN PATENT DOCUMENTS

| | | |
|---|---|---|
| WO | WO 2008/010274 | 1/2008 |
| WO | WO 2015/148562 | 10/2015 |

* cited by examiner

DEVICE FOR LIGHTING AND OPTICAL COMMUNICATION COMBINED WITH VIEWING OF THE COMMUNICATION FIELD

RELATED APPLICATIONS

This application is the U.S. National Phase of Application No. PCT/FR2017/053179 entitled "DEVICE FOR LIGHTING AND OPTICAL COMMUNICATION COMBINED WITH VIEWING OF THE COMMUNICATION FIELD" and filed Nov. 20, 2017, which claims the benefit of French Patent Application No. 1661655, filed Nov. 29, 2016, each of which is incorporated by reference in its entirety.

TECHNICAL FIELD

The present invention relates to the field of wireless communications and, more particularly, to the field of data transmission based on the use of light, in the visible or near-visible, such as the ultraviolet or infrared, range of wavelengths.

PRIOR ART

Substantial progress has been made in the last few years in the field of wireless communications. In particular, connection standards such as 4G, Wi-Fi, Wimax or even Bluetooth allow users to access all sorts of services online with a very good quality of service. These technologies are based on the use of the electromagnetic spectrum to transmit data.

At the present time, technologies are emerging that allow high-bandwidth transmission of data by modulation of the visible light emitted by luminaries such as for example LED lamps (LED standing for light-emitting diode). LiFi (for light fidelity) is one exemplary wireless communication standard based on the use of visible or near-visible light.

These transmission technologies have many advantages. They allow, by taking advantage of the many light fittings installed in dwellings, offices, means of transportation or public spaces, the number of network access points to be multiplied without running the risk of saturating frequencies in the electromagnetic spectrum. They are also of interest for security reasons because the zone of coverage is visible to the naked eye and limited to the zone of illumination. Thus, such lamps, installed for example above open-space offices, make it possible in particular to guarantee that only those items of equipment directly illuminated by these lamps will be able to make use of the connection.

One drawback of these lamps lies in the fact that users find it difficult to quickly and easily identify whether a lamp is capable of providing, or otherwise, the data transmission service at a given time.

SUMMARY OF THE INVENTION

To this end, the invention relates to a lighting device comprising:
 at least one first fixed light source for providing illumination;
 at least one second light source for transmitting data by modulating the light;
 first and second optical refractor devices positioned, respectively, with respect to said first and second light sources so as to capture the light emitted by said sources and to form, respectively, distinct first and second light beams, said second light beam defining a zone suitable for the transmission of data.

Such a lighting device is noteworthy in that it includes a variator device for varying the luminosity and/or the color of the first light beam, which device is suitable for accentuating or decreasing the visibility of the data transmission zone defined by the second light beam, the variator device being activated when the first light source is held in a fixed position.

The advantage of the lighting device according to the invention is that it allows satisfactory ambient illumination to be provided while explicitly signalling to the user, by virtue of the variations in luminosity and/or illumination of the first light beam, the edge of the data transmission zone, as well as the availability or unavailability of the data transmission provided in this zone. Another advantage of the lighting device according to the invention is that it needs no parts that are made movable with a view to modifying the visual appearance of a light beam for providing illumination.

In one variant, the light sources provide the dual function of illumination and data transmission.

In one particular embodiment, the lighting device is such that the light sources are LEDs.

The lighting device may use LEDs for the illumination and data transmission function. LEDs are particularly suited to data transmission because they are inexpensive, compact, consume little energy and allow high-frequency light modulation, allowing high transmission rates.

According to another particular embodiment, the variator device for varying the luminosity and/or the color of the first light beam is deactivated upon the establishment of a communication session, by a communication terminal, in the zone suitable for the transmission of data, and activated, respectively, at the end of said session.

According to another particular embodiment, the variator device for varying the luminosity and/or the color of the first light beam is deactivated in the case that a number of communication sessions in the zone suitable for the transmission of data is equal to a predetermined threshold, and activated, respectively, in the case that a number of communication sessions in the zone suitable for the transmission of data is lower than said predetermined threshold.

According to another particular embodiment, the variator device for varying the luminosity and/or the color of the first light beam is deactivated in the case that the data transmission service in the zone suitable for data transmission is unavailable, and activated, respectively, in the case that said data transmission service is made available.

Such an arrangement according to the three embodiments mentioned above thus allows any user who might wish to connect in the data transmission zone to quickly and unambiguously identify the availability or unavailability of this zone.

According to another particular embodiment, the lighting device further comprises a driver device for driving the variator device for varying the luminosity and/or the color of the first light beam, which device is suitable for adjusting one or more luminosity and/or color variation parameters applied by the variator device.

Such parameters are for example:
 the sequencing of the variation in luminosity and/or color of the first light beam;
 the speed of the sequencing;
 the amplitude of the variation in luminosity and/or color of the first light beam;
 etc.

Such an arrangement thus allows a wide range of possible variations to be applied to the light beam emitted by the light source for providing illumination to be made available without requiring this light source to be moved in any way. By varying one or more of the aforementioned parameters, various lighting effects may be produced, affecting the illumination of the data transmission zone and resulting in enhanced identification of the data transmission zone.

According to another particular embodiment, the lighting device comprises a plate that includes a central zone and a peripheral zone and wherein:

a first set of light sources is arranged in the central zone;

a second set of light sources is arranged in the peripheral zone, the light sources of one of the sets being for providing illumination and the light sources of the other set being for transmitting data by modulating the light, an optical refractor device being positioned in front of each light source.

The lighting device comprises a plate to which the light sources are fitted. This may be for example a printed circuit board to which the LEDs are fitted. One portion of the light sources, for example those located in the center of the plate, is suitable for transmitting data in the form of an optical signal. The other portion of the light sources, fitted for example at the periphery of the plate, provides a conventional illumination function.

The lighting device further includes a plurality of optical refractor devices arranged in front of the light sources. The optical refractor devices for the central portion may have different characteristics with respect to the optical refractor devices for the peripheral portion so as to produce beams having different characteristics. Thus, for example, the optical refractor devices of the central portion are for example perfect lenses, whereas the optical refractor devices of the peripheral portion are distorting lenses exhibiting irregularities. A single lighting device according to the invention thus allows satisfactory ambient illumination to be provided while guaranteeing optimal data transfer toward a specific site.

According to one variant embodiment, at least two refractor devices positioned, respectively, in front of two light sources for providing illumination are of different types.

In this way, at least two distorting lenses exhibit irregularities that differ from one distorting lens to the next.

Such optical refractor devices are thus positioned so as to capture the light from the light sources and to form a beam of light having characteristics that depend on the optical refractor devices used. Thus, the light sources for providing illumination alone may have refractor devices that differ from one another and thus emit, respectively, light beams that differ from one another, whereas the light from the light sources for transmitting data may be concentrated into a beam allowing a particular site to be targeted.

According to another particular embodiment, the lighting device comprises a plate on which the following are mounted:

at least one light source for transmitting data by modulating the light, in front of which an optical refractor device is positioned, the scattering axis of the light emitted by said at least one source being oriented toward the exterior of the lighting device;

at least one light source for providing illumination, in front of which an optical reflector device is positioned, the scattering axis of the light emitted by said at least one light source for providing illumination being oriented in the opposite direction with respect to the scattering axis of the light emitted by said at least one light source for transmitting data by modulating the light.

The lighting device comprises a plate to which the light sources are fitted. This may be for example a printed circuit board on each of the faces to which the LEDs are fitted. The one or more light sources located on the face oriented toward the exterior of the lighting device are suitable for transmitting data in the form of an optical signal. The one or more light sources located on the face oriented towards the interior of the lighting device provide a conventional illumination function.

The lighting device further includes an optical refractor device arranged in front of each light source for transmitting data and a reflector device in front of each light source for providing illumination. The optical reflector devices form for example a set of facets consisting of a reflective material (e.g. plastic material) that are arranged with respect to one another so as to conform to the indirect light scattering zone.

Such an arrangement thus allows a particularly compact lighting device to be obtained, without negatively affecting the quality of the ambient illumination and the optimization of the data transfer toward a specific site.

According to another particular embodiment, the lighting device further comprises an optical refractor device that is placed in the path of at least one light ray reflected by the reflector device positioned in front of said at least one light source for providing illumination.

Such an optical refractor device is arranged within the lighting device so as to capture the light reflected by the reflector devices and to scatter it in the form of a plurality of light beams concentrated around the light beam emitted by the one or more light sources for transmitting data, the beam angle of the plurality of light beams emitted by the plurality of light sources differing from that of the light beam emitted by the one or more light sources for transmitting data.

According to another particular embodiment, the plate of the lighting device constitutes the reflector device positioned in front of said at least one light source for providing illumination.

Such an arrangement optimizes the compactness of the structure of the lighting device.

LIST OF THE FIGURES

Other features and advantages of the invention will become more clearly apparent upon reading the following description of particular embodiments of the invention, provided by way of simple illustrative and nonlimiting example, and appended drawings, in which.

Figure 8:
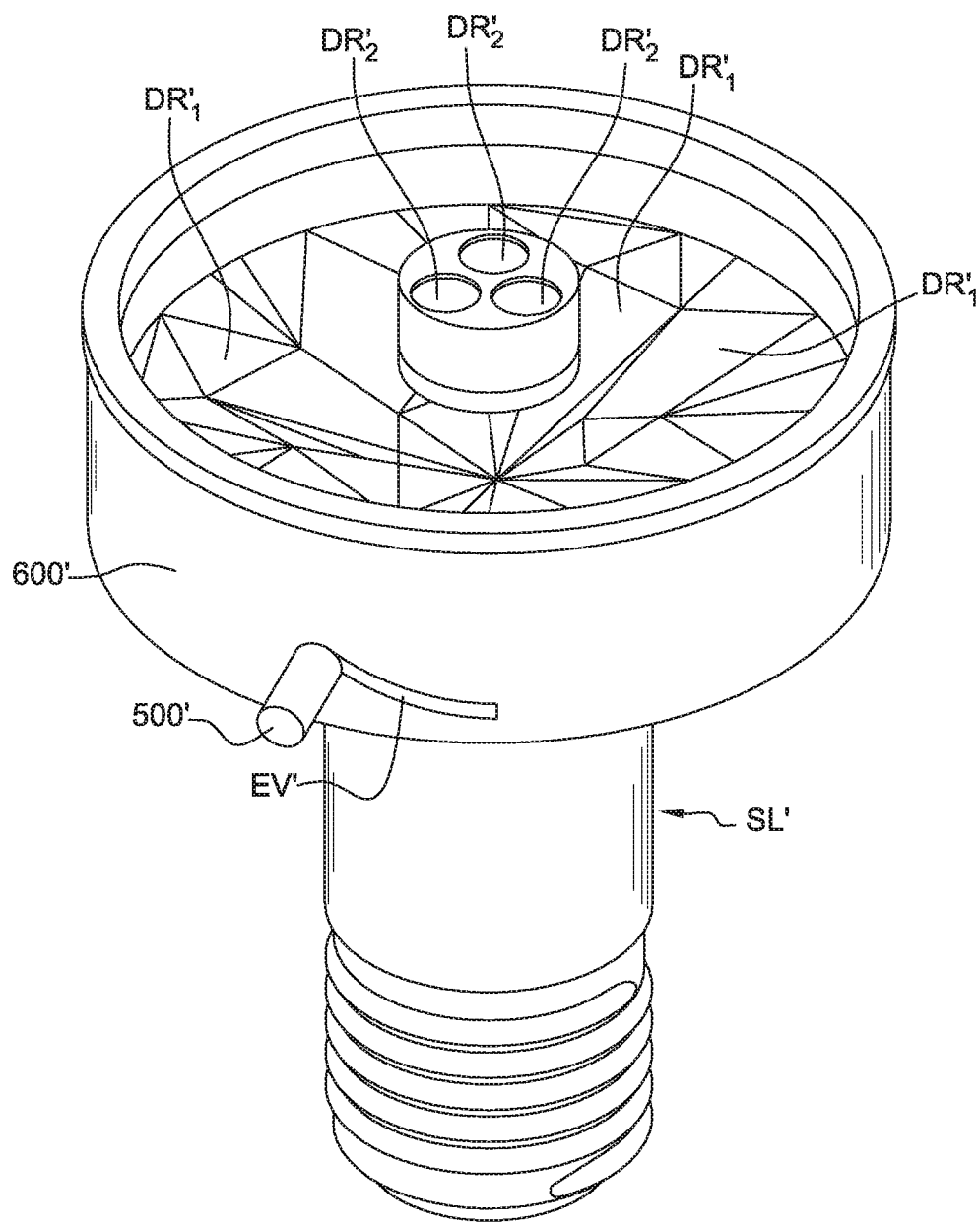
FIG. 8 shows a perspective view of the lighting device according to the second embodiment.
Figure 10A:
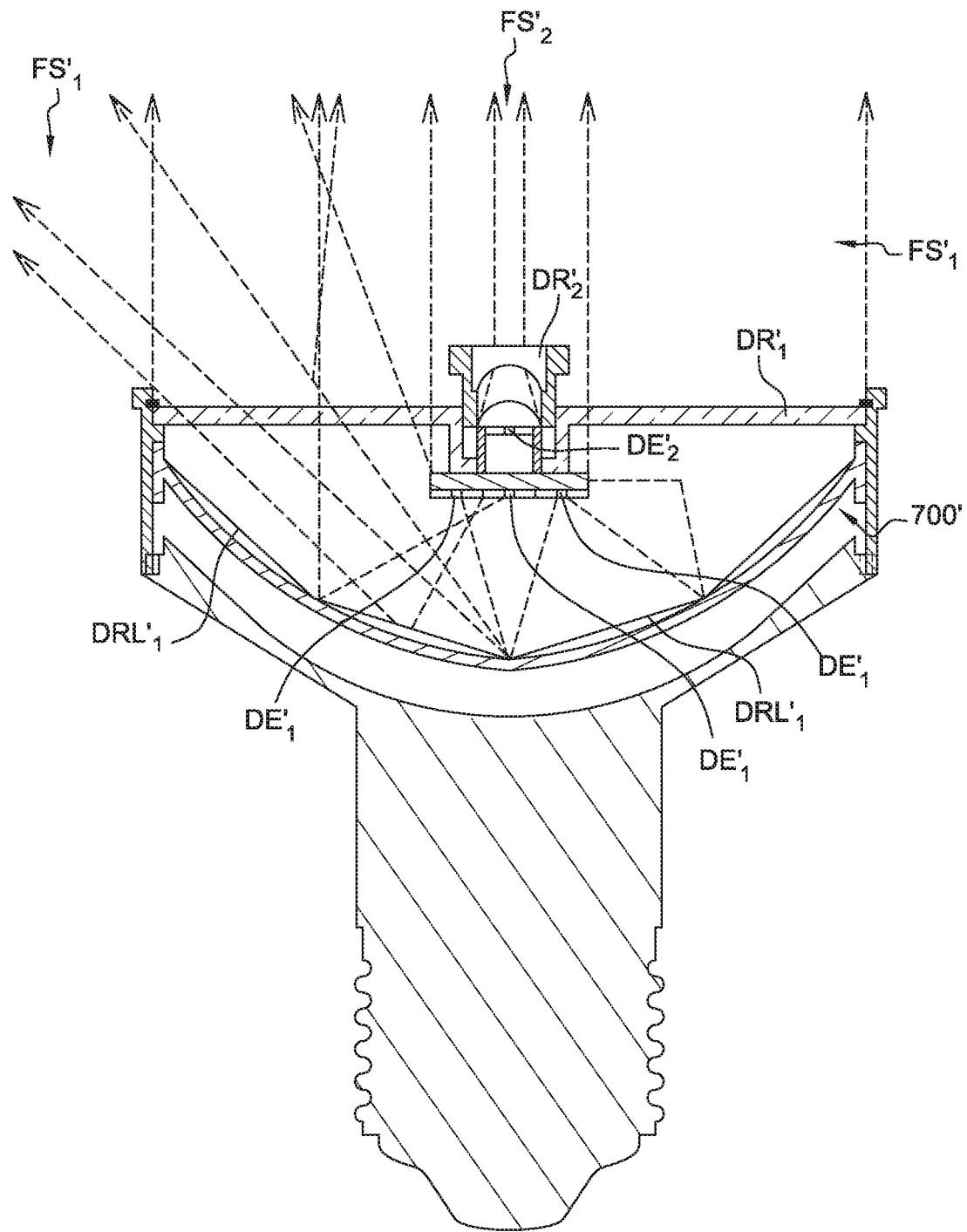
Figure 10B:
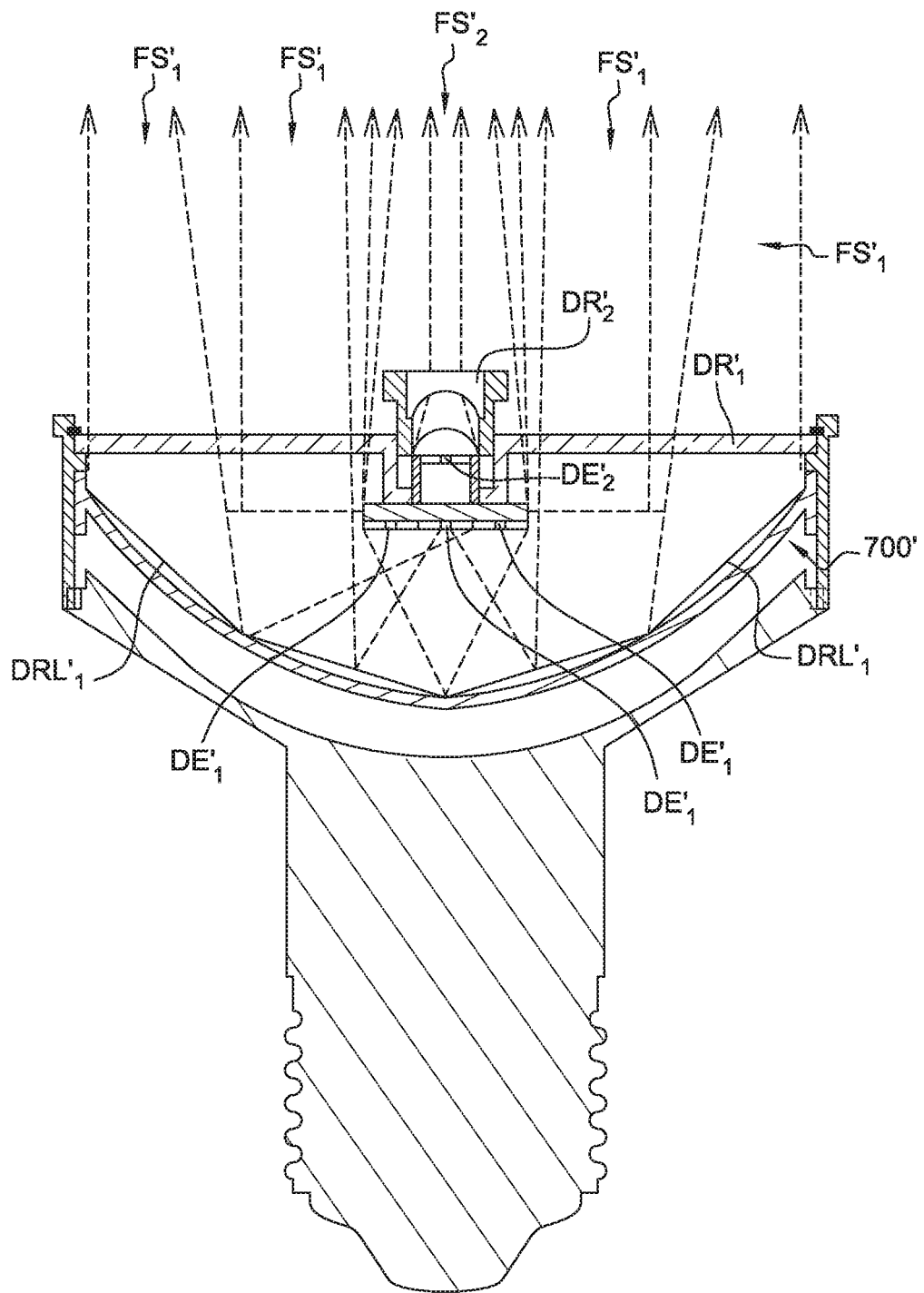
Figure 10C:
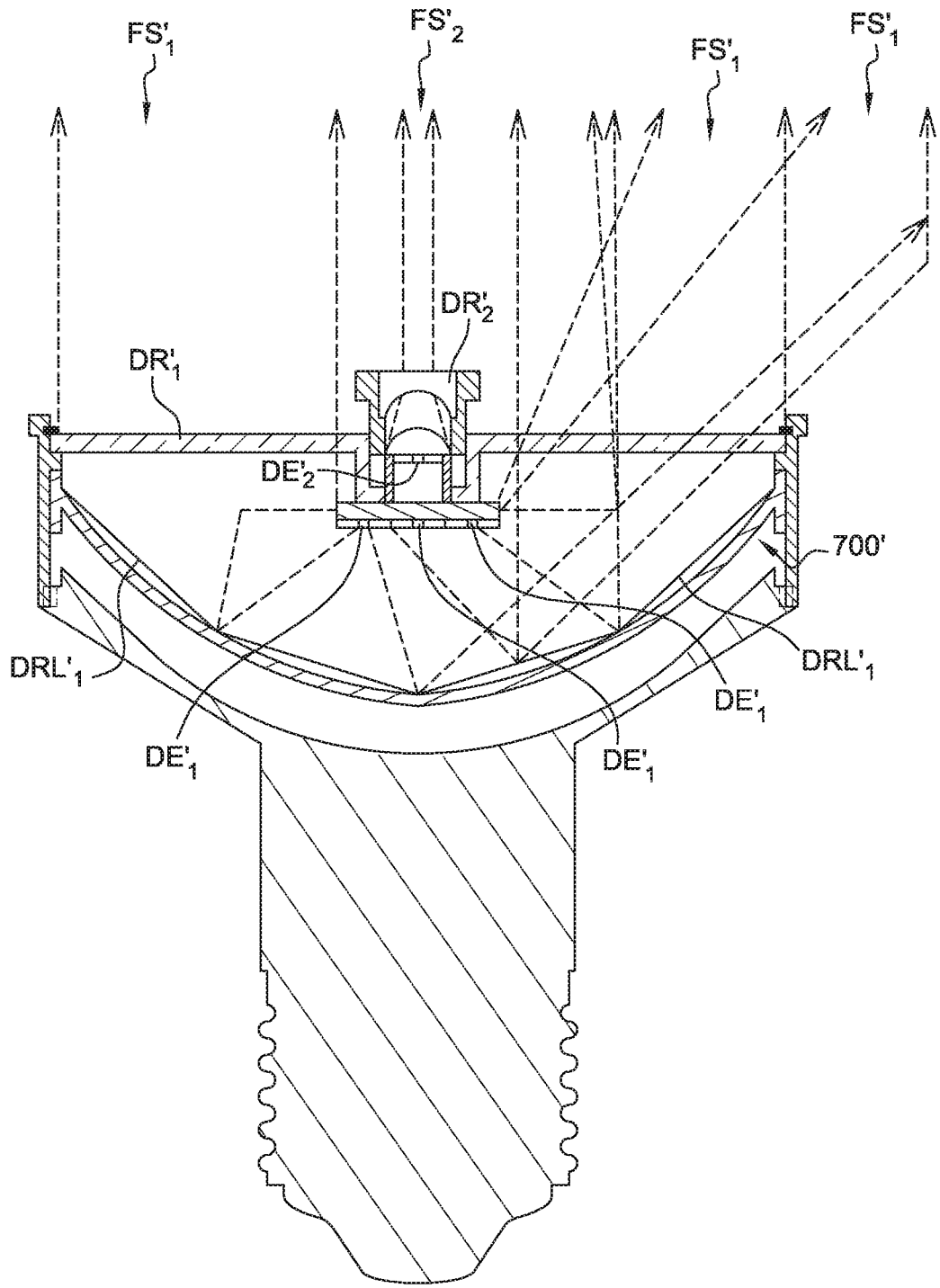

FIGS. 10A to 10C each show a sectional view of the lighting device of FIG. 8 when the lighting device is in operation in three different illumination modes, respectively.

DETAILED DESCRIPTION

Figure 1:
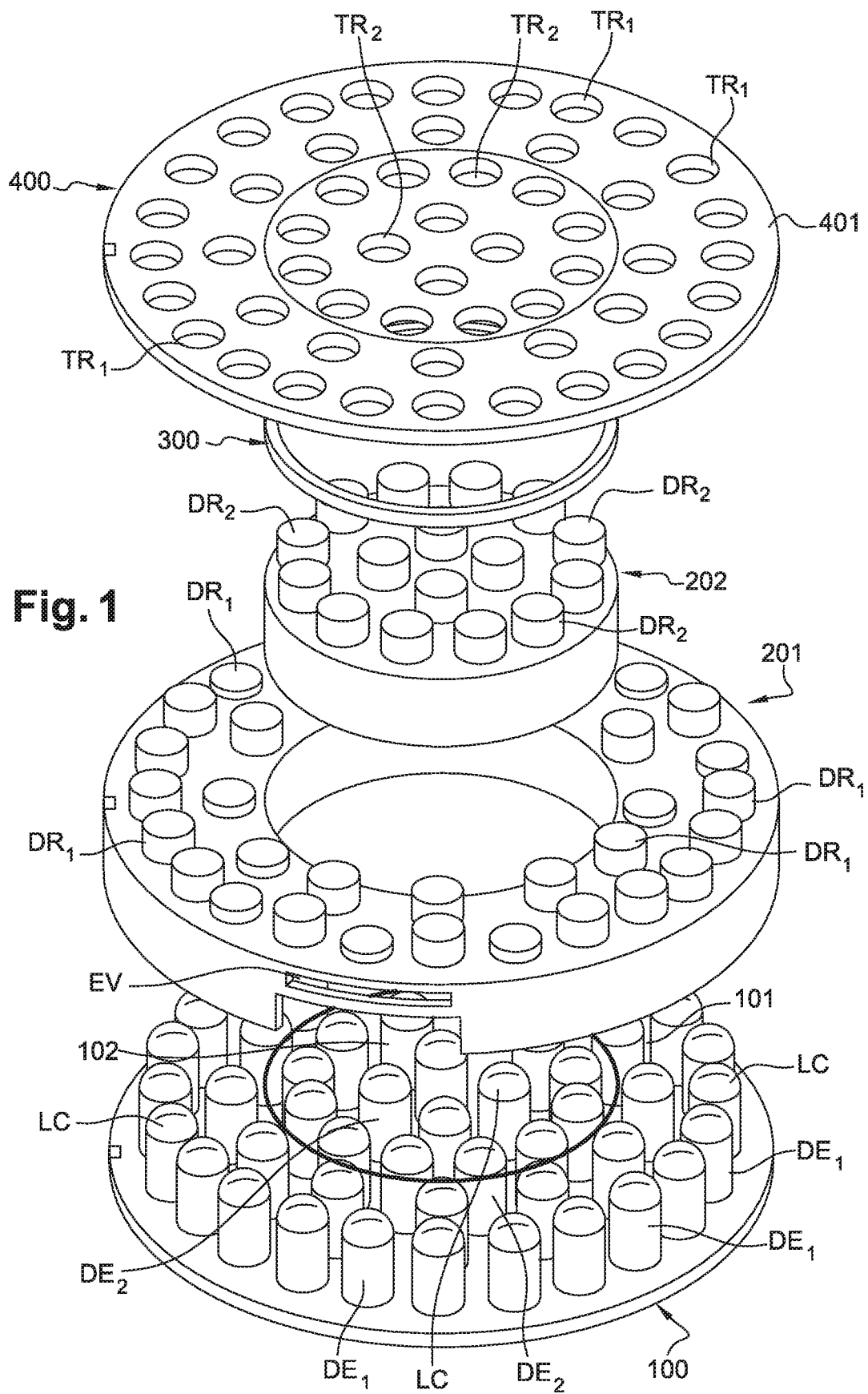
FIG. 1 shows an exploded view of an assembly of various optical and lighting elements making up the lighting device according to a first embodiment.

With reference to FIG. 1, an exploded view of an assembly of various optical and lighting elements making up the lighting device according to a first embodiment of the invention is shown.

Light sources, such as for example light-emitting diodes $DE_1$, $DE_2$, are fitted to a plate 100, for example taking the shape of a circle and comprising a printed circuit board. For the clarity of the figure, only some diodes are marked by the reference $DE_1$ or $DE_2$. The peripheral zone 101 of the plate 100, defined by at least the first ring of diodes located closest to the edge of the plate, bears a set of first diodes $DE_1$ that are only for illumination. In the example shown, a first and a second ring of diodes for illumination define the peripheral zone 101 of the plate 100. Regarding the remaining zone of the plate 100, referred to as the central zone 102, it bears a set of second light-emitting diodes $DE_2$ for the transmission of data in the optical spectrum. Such diodes $DE_2$ are capable of transmitting data by modulating visible or near-visible light. To achieve this, the diodes are for example connected to a suitable modulating component (not shown), such as for example the microcontroller RL78/I1A sold by Renesas™. The peripheral zone 101 and the central zone 102 may each comprise one or more light-emitting diodes.

According to another embodiment, the light-emitting diodes for transmitting data are located in the peripheral zone 101 while the light-emitting diodes used only for illumination are located in the central zone 102.

According to another embodiment, the light-emitting diodes $DE_2$ for transmitting data also provide illumination.

Convergent lenses LC are mounted on the plate 100 such that each lens is positioned facing a corresponding light-emitting diode $DE_1$ or $DE_2$. Thus, the light emitted by each of the light-emitting diodes $DE_1$ or $DE_2$ is received by a lens LC and redirected into a convergent beam. For the clarity of the figure, only some lenses are marked by the reference LC.

According to one particular embodiment, the lenses LC of the peripheral zone 101 and those of the central zone 102 have different optical characteristics.

According to one particular embodiment, the convergent lenses are incorporated directly within the light-emitting diodes $DE_1$ or $DE_2$. For example, these may be light-emitting diodes having an integrated optic or light-emitting diodes to which lenses are added using a lens holder.

According to the invention, the lighting device further comprises:
 a first element 201 suitable for the peripheral zone 101 of the plate 100 and including a first set of refractor devices $DR_1$, each of which is arranged in the axis of a corresponding light-emitting diode $DE_1$ of the peripheral zone 101; and
 a second element 202 suitable for the central zone 102 of the plate 100 and including a second set of refractor devices $DR_2$, each of which is arranged in the axis of a corresponding light-emitting diode $DE_2$ of the central zone 102.

For the clarity of the figure, only some refractor devices are marked by the reference $DR_1$ or $DR_2$.

According to one particular embodiment, the first element 201 and the second element 202 are made of molded transparent plastic.

According to one particular embodiment, the refractor devices $DR_1$ are distorting divergent lenses. According to a first variant (not shown), the shape of these distorting lenses may vary from one lens to the next. According to a second variant such as shown in FIG. 1, various subsets of these distorting lenses take a particular shape which varies from one subset to the next.

According to one particular embodiment, the refractor devices $DR_2$ are perfect divergent lenses.

The second element 202 is rigidly connected to the plate 100 by a retaining ring 300.

The plate 100, the first element 201, the second element 202 and the ring 300 are intended to be held together in a lighting device according to the invention by means of a retaining plate 400, the shape of which corresponds to that of the plate 100. To this end, the plate 400 comprises:
 a peripheral zone 401 provided with holes $TR_1$ and matching the peripheral zone 101 of the plate 100; and
 a central zone 402 provided with holes $TR_2$ and matching the central zone 102 of the plate 100.

For the clarity of the figure, only some holes are marked by the reference $TR_1$ or $TR_2$.

The number of holes $TR_1$ corresponds to the number of refractor devices $DR_1$ and the number of holes $TR_2$ corresponds to the number of refractor devices $DR_2$, such that, when all of the elements of the lighting device that are described above are assembled together, the holes $TR_1$ cooperate, respectively, with the refractor devices $DR_1$ and the holes $TR_2$ cooperate, respectively, with the refractor devices $DR_2$.

Figure 2:
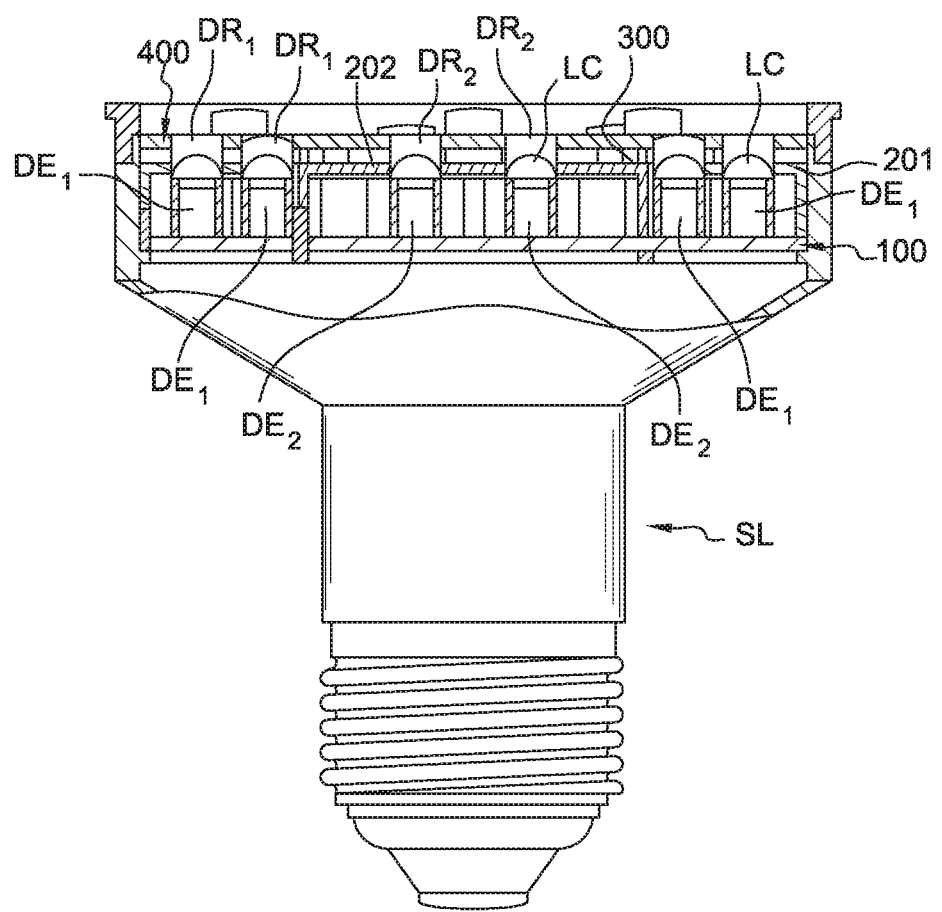
FIG. 2 shows a side view of the lighting device of FIG. 1, a section through the assembly of FIG. 2 shown as a cutaway.
Figure 3:
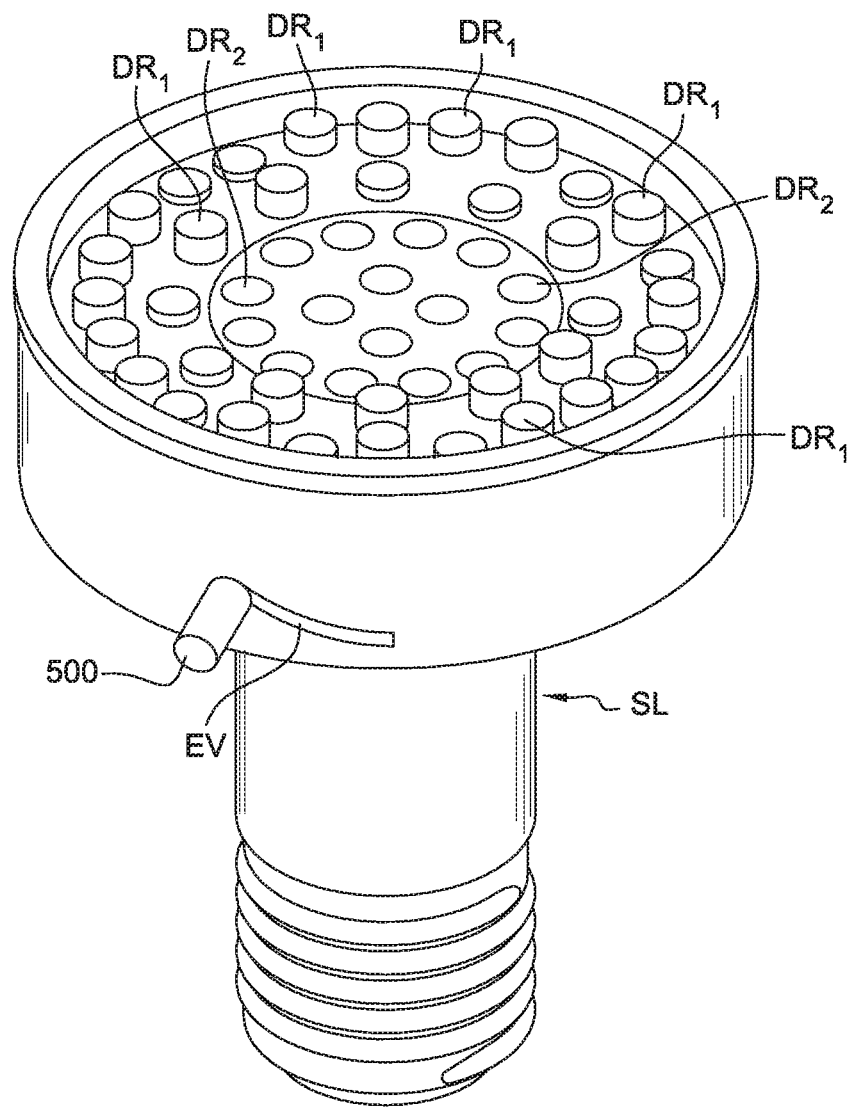
FIG. 3 shows a perspective view of the lighting device of FIG. 1.

Such an assembly is shown in section in FIG. 2, in which the references used are the same as those of FIG. 1. This assembly may advantageously be mounted on a lamp fitting SL of standard size, such as shown in FIGS. 2 and 3. In the example shown, this is for example a spot lamp, which allows this assembly to be mounted easily at sites already intended for lighting.

Figure 4:
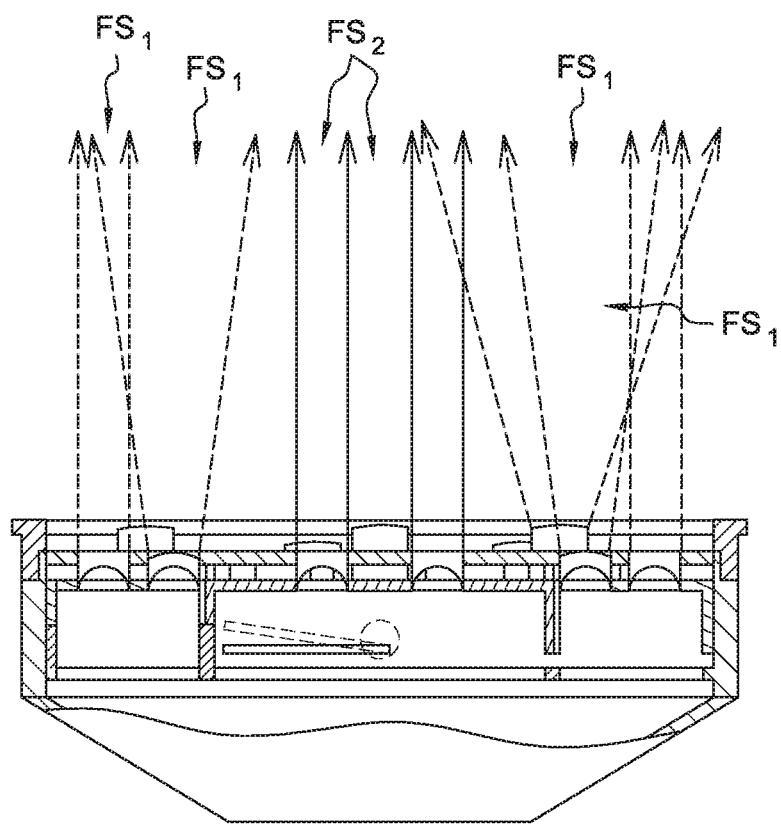
FIG. 4 shows a portion of FIG. 2 illustrating the lighting device in operation, in which a plurality of light beams with different characteristics emitted by this device are shown.

By virtue of such an assembly and the particular configuration of the refractor devices $DR_1$ and $DR_2$, as shown in FIG. 4, the lighting device according to the invention makes it possible to produce:
 a plurality of first, central beams $FS_2$, represented by solid lines, each of said beams $FS_2$ being capable of data transmission and having a narrow beam angle;
 a plurality of second, peripheral beams $FS_1$, represented by dashed lines, each beam $FS_1$ being concentrated around the first central beams $FS_2$ and being for providing illumination only, some of said second beams each having a beam angle that is wider than that of the first beams and some others of said second beams each having a beam angle that is similar or equal to that of the first beams, the beam angles of the second beams further being able to vary according to the subset of refractor devices $DR_1$ in question.

The effect produced by the interference between the various beams $FS_1$ is the creation of an interplay of light and shadow thus allowing satisfactory ambient illumination to be obtained while guaranteeing optimum data transfer toward a specific site.

According to one particular embodiment, the first element 201 and the second element 202 are translationally movable along an axis that is perpendicular to the plate 100. Since the element 201 and 202 bear divergent optical refractor devices, it is thus possible to vary the distance between the convergent lenses LC of the plate 100 on the one hand and the optical refractor devices $DR_1$ of the first element 201 and/or the optical refractor devices $DR_2$ of the second element 202 on the other hand so as to modify the characteristics of the light beams emitted by the light-emitting diodes $DE_1$ and $DE_2$. The distance between the plate 100 and the first element 201 may be different from the distance between the plate 100 and the second element 202. In this way, it is possible to obtain two concentric beams having different characteristics at the output of the lighting device. In particular, the lighting device allows both a narrow beam from the light sources for data transmission and a wider beam from the light sources for providing illumination only to be produced.

According to one particular embodiment, the lighting device includes an adjusting mechanism that is suitable for applying a translational movement along an axis that is perpendicular to the plate to at least one of the sets 201 and 202.

Such an adjusting mechanism allows a user to adjust at least one of the light beams emitted by the lighting device. For example, the lighting device may include a first wheel allowing the distance between the first set 201 of refractor devices $DR_1$ and the light-emitting diodes $DE_1$ to be adjusted and a second wheel allowing the distance between the second set 202 of refractor devices $DR_2$ and the light-emitting diodes $DE_2$ to be adjusted.

The beams emitted by the lighting device may thus be modified by a user. For example, in the case that the light sources of the central portion are for transmitting data while the sources of the peripheral portion are for providing an illumination function only, a user may increase or decrease the distance between the first element, corresponding to the central zone and including light sources for transmitting data, and the convergent lenses so as to obtain an illumination beam providing a wider or narrower beam angle and a more or less uniform distribution of the illuminated field. Thus, more or less contrast in the interplay of light and shadow produced by the lighting device according to the invention is advantageously obtained.

One nonlimiting example of such an adjusting mechanism is illustrated in FIGS. 1 and 3 and marked by the reference 500. The adjusting mechanism 500 allows a user to adjust the position of the elements 201 and 202 with respect to the plate 100 while keeping the light-emitting diodes $DE_1$, $DE_2$, the convergent lenses LC and the optical refractor devices $DR_1$, $DR_2$ aligned.

The adjusting mechanism 500 comprises for example a grip rod that is rigidly connected to the element 201 and capable of sliding into an oblong-shaped void EV, formed in the element 201, so as to rigidly connect the elements 201 and 202 such that they rotate together while allowing the elements 201 and 202 to move with respect to one another along a trajectory that is perpendicular to the plate 100.

Figure 5:
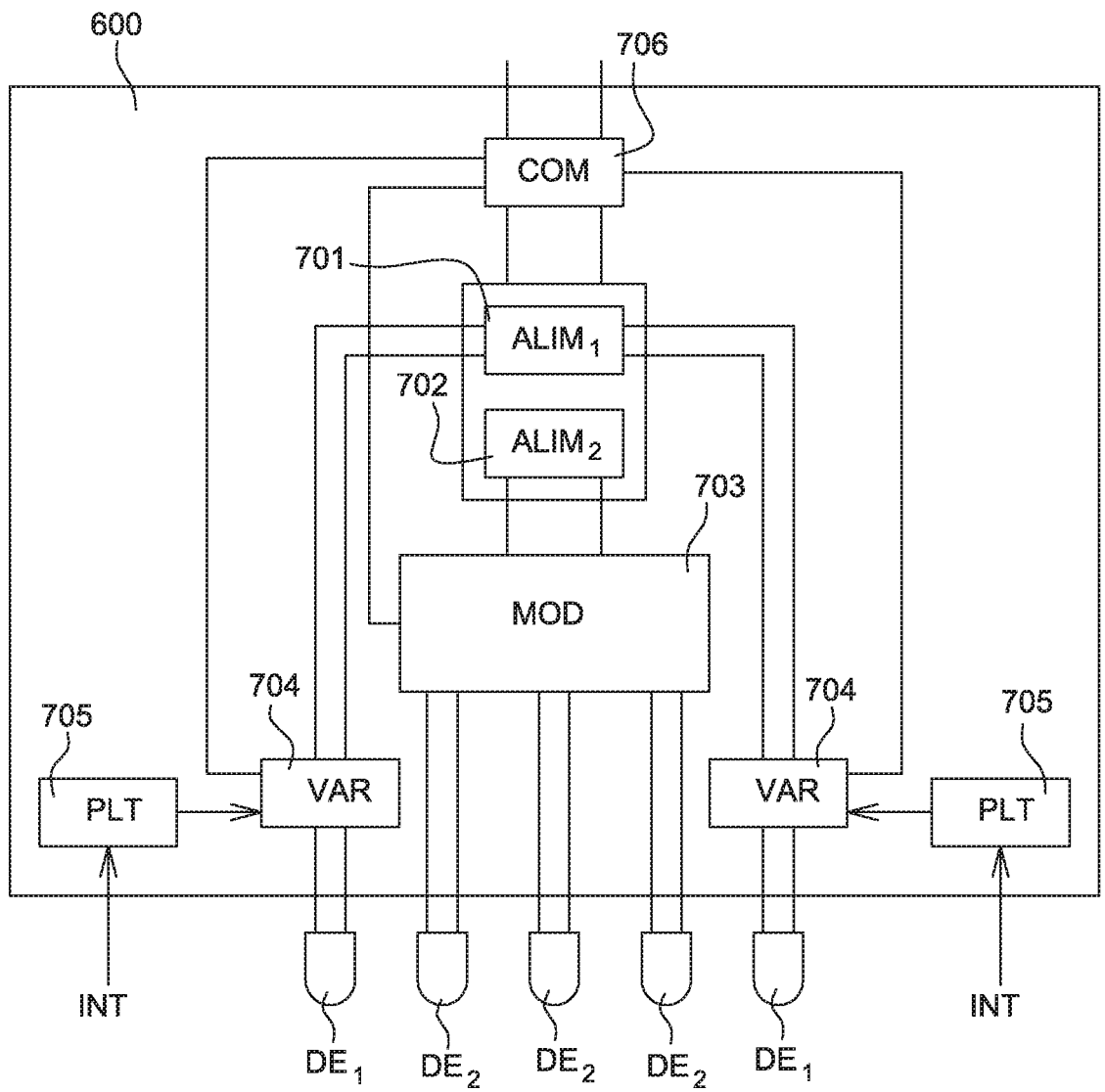
FIG. 5 is a simplified and nonlimiting illustration of an assembly of electronic components suitable for providing an illumination function alone and a function of illumination with data transmission, as well as a function of varying the luminosity and/or the color according to one particular embodiment of the invention.

With reference to FIG. 5 now, a simplified and nonlimiting illustration of an assembly of electronic components suitable for providing an illumination function alone and a function of illumination with data transmission according to one particular embodiment of the invention is described.

The assembly may be incorporated within a housing 600, such as for example within a bulb or a bulb base. The light-emitting diodes $DE_1$ of the first set 201 mentioned above, numbering two for example, are connected to a power supply 701 ($ALIM_1$). The light-emitting diodes $DE_2$ of the second set 202 mentioned above, numbering three for example, are connected to a power supply 702 ($ALIM_2$). A modulating component 703 (MOD) suitable for varying, at high frequency, the illumination delivered by the light-emitting diodes $DE_2$ so as to transmit data by means of visible light is further connected between the power supply 702 ($ALIM_2$) and the light-emitting diodes $DE_2$. As mentioned previously in the description, this may be a microcontroller capable of operating at high frequency and programmed for this purpose. For example, the microcontroller RL78/I1A sold by Renesas™ may be adapted for such a use. Thus, the light-emitting diodes $DE_1$ are able to provide an illumination function only whereas the light-emitting diodes $DE_2$ may, in addition to an illumination function, provide a data transmission function.

According to the invention, the lighting device further comprises a variator 704 (VAR) for varying the luminosity and/or the color of the one or more light beams emitted by the light-emitting diodes $DE_1$, which variator is suitable for accentuating or decreasing the visibility of the data transmission zone defined by the one or more light beams emitted by the light-emitting diodes $DE_2$. It is ensured that such a variator device is activated once the distance between the first element 201 bearing the optical refractor devices $DR_1$ and the light-emitting diodes $DE_1$ has been adjusted using the mechanism 500, and the first element 201 is thus held in a fixed adjusting position.

Such a variator 704 allows the supply of power to the light-emitting diodes $DE_1$ to be regulated and varied continuously, individually or even in groups.

According to one particular embodiment, the lighting device further comprises a driver device 705 (PLT) for driving the variator 704 for varying the luminosity and/or color. The driver device 705 is suitable for adjusting one or more luminosity and/or color variation parameters applied by the variator device 704.

Such parameters are for example:
the sequencing of the variation in luminosity and/or color of the one or more light beams emitted by the light-emitting diodes $DE_1$, sequencing types or modes possibly being predetermined;
the speed of execution of the sequencing, speed of execution types or modes possibly being predetermined;
the amplitude of the variation in luminosity and/or color of the one or more light beams emitted by the light-emitting diodes $DE_1$, amplitude types or modes possibly being predetermined;
etc.

According to one particular embodiment, the driver device 705 may be provided with a hardware or software interface (INT) that allows a manager of the lighting device to manually or remotely select the various sequencing, amplitude or speed types or modes.

Such an arrangement thus allows a wide range of possible variations to be applied to said one or more emitted light beams to be made available without requiring the light-emitting diodes $DE_1$ to be moved in any way. By varying one or more of the aforementioned parameters, various lighting effects may be produced, affecting the illumination of the data transmission zone and thus resulting in enhanced identification of the data transmission zone.

In one particular embodiment, the lighting device further includes a communications module 706 (COM) suitable for receiving and interpreting data received via a communications network. For example, the communications module may be a network interface implementing a power-line communication (PLC) transmission technology or a Bluetooth or even Wi Fi interface.

The communications module 706 is connected to the modulating component 703. In this way, the device may retransmit, in the spectrum of visible or near-visible light, data received from a communications network, while providing a conventional illumination function by means of the light-emitting diodes $DE_2$.

The communications module 706 is also connected to the variator 704. In this way, according to a first embodiment, the variator 704 is deactivated upon the establishment of a communication session, by a communication terminal, via the communication module 706, in the zone suitable for the transmission of data, and activated, respectively, at the end of this session.

According to a second variant embodiment, the variator 704 is deactivated in the case that a number of communication sessions, via the communication module 706, in the zone suitable for the transmission of data is equal to a predetermined threshold, and activated, respectively, in the case that a number of communication sessions, via the communication module 706, in the zone suitable for the transmission of data is lower than said predetermined threshold.

According to a third variant embodiment, the variator 704 is deactivated in the case that the data transmission service, via the communication module 706, in the zone suitable for data transmission is unavailable, and activated, respectively, in the case that said data transmission service is made available.

It is thus possible, for any user who might wish to connect in the data transmission zone, to quickly and unambiguously identify the availability or unavailability of the data transmission zone.

Figure 6:
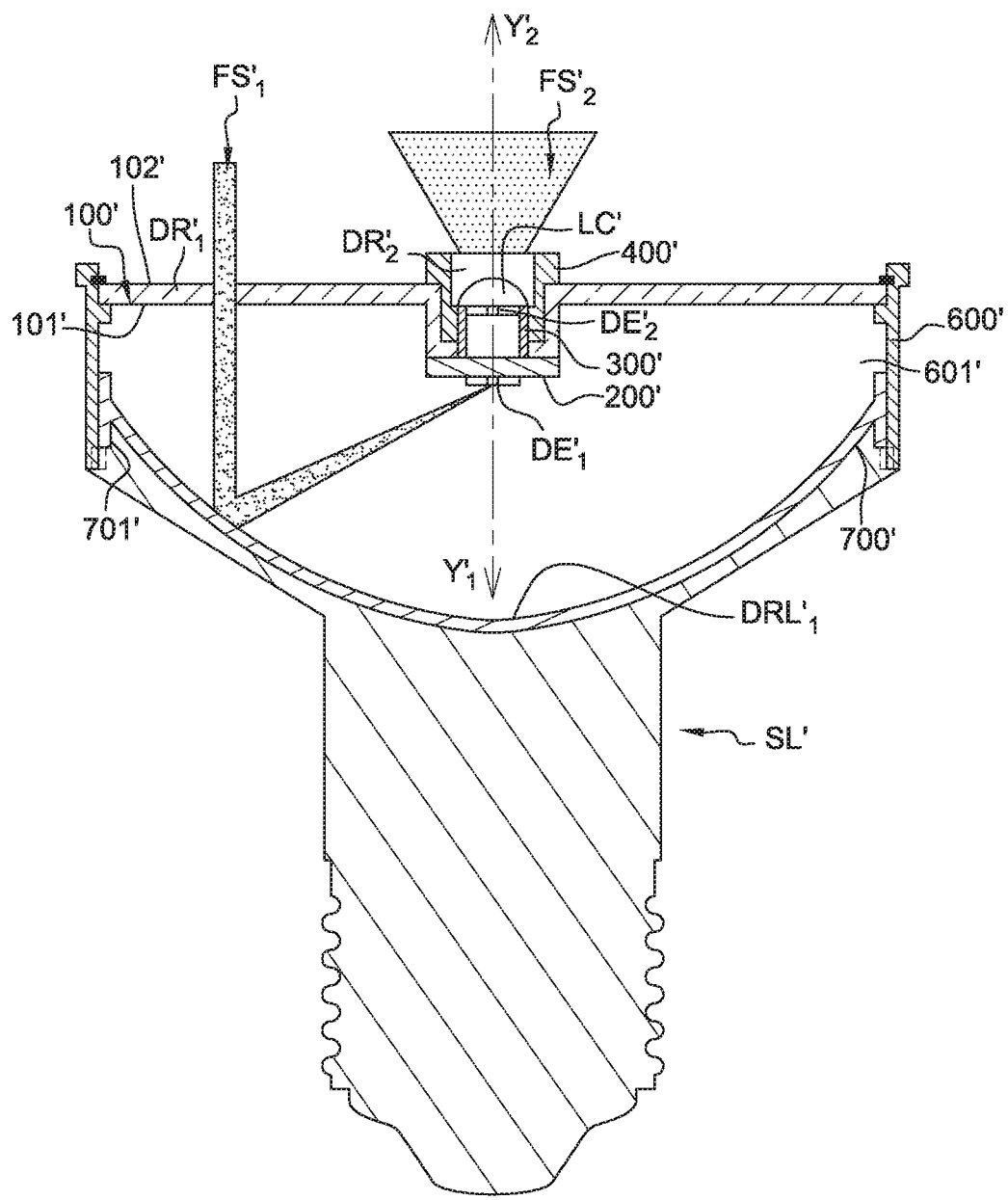
FIG. 6 shows a sectional view of a lighting device according to a second embodiment of the invention, in which the details of an assembly of various optical and lighting elements making up the lighting device are illustrated, in which optical elements are in a first operating position.

With reference to FIG. 6 onward, a lighting device according to a second embodiment of the invention will now be described.

A lighting device according to this second embodiment of the invention comprises an assembly of electronic components such as that described in FIG. 5.

With reference to FIG. 6, a sectional view of an assembly of various optical and lighting elements making up the lighting device according to the second embodiment of the invention is shown.

Like in the first embodiment, this assembly may advantageously be mounted on a lamp fitting SL' of standard size. In the example shown in FIG. 6 onward, this is for example a spot lamp, which allows this assembly to be mounted easily at sites already intended for lighting.

Light sources, such as for example light-emitting diodes, are fitted to each of the faces 101' and 102' of a plate 100', for example a plate 100' taking the shape of a circle and comprising a printed circuit board. The inside face 101' of the plate 100' bears at least one first light-emitting diode $DE'_1$ for providing illumination only. In the example shown, the diode $DE'_1$ is fixedly mounted on a surface 200' that is attached in the center of the inside face 101' of the plate 100' such that the scattering axis $Y'_1$ of the light emitted by the at least one first diode $DE'_1$ is oriented toward the interior of the lighting device. The outside face 102' of the plate 100' bears at least one second light-emitting diode $DE'_2$ for transmitting data in the optical spectrum. Such a diode $DE'_2$ is capable of transmitting data by modulating visible or near-visible light. To achieve this, the diode $DE'_2$ is for example connected to a modulating component (not shown), such as for example the microcontroller RL78/I1A sold by Renesas™. In the example shown, the diode $DE'_2$ is fixedly mounted on a holder 300', which is itself attached to the surface 200' in the center of the outside face 102' of the plate 100', such that the scattering axis $Y'_2$ of the light emitted by the at least one second diode $DE'_2$ is oriented toward the exterior of the lighting device, in the opposite direction with respect to that of the scattering axis $Y'_1$.

The inside face 101' of the plate 100' may comprise one or more light-emitting diodes $DE'_1$. The outside face 102' of the plate 100' may comprise one or more light-emitting diodes $DE'_2$. For example, in the exemplary embodiment of FIG. 8, the lighting device comprises three light-emitting diodes $DE'_2$.

The plate 100' is attached to the inside periphery of a housing 600' of the lighting device.

According to another embodiment (not shown), the light-emitting diodes $DE'_2$ for transmitting data are located on the inside face 101' of the plate 100' while the light-emitting diodes $DE'_1$ used only for illumination are located on the outside face 102' of the plate 100'.

According to another embodiment, the light-emitting diodes $DE'_2$ for transmitting data also provide illumination.

According to one particular embodiment, the plate 100' is made of transparent plastic material.

A convergent lens LC' is mounted on the holder 300' in the center of the plate 100', so as to be positioned facing the corresponding light-emitting diode $DE'_2$. Thus, the light emitted by the light-emitting diode $DE'_2$ is received by the lens LC' and redirected into a convergent beam $FS'_2$.

In the case that the plate 100' bears a plurality of light-emitting diodes $DE'_2$, each of said diodes is thus associated with a convergent lens LC'.

In one particular embodiment, the convergent lens LC' is incorporated directly within the light-emitting diode $DE'_2$. For example, this may be a light-emitting diode having an integrated optic or a light-emitting diode to which a lens is added using a lens holder.

According to the invention, the lighting device further comprises a refractor device $DR'_2$ arranged in the axis of the light-emitting diode $DE'_2$.

According to one particular embodiment, the refractor device $DR'_2$ is made of molded transparent plastic.

According to one particular embodiment, the refractor device $DR'_2$ is a perfect divergent lens.

Figure 7:
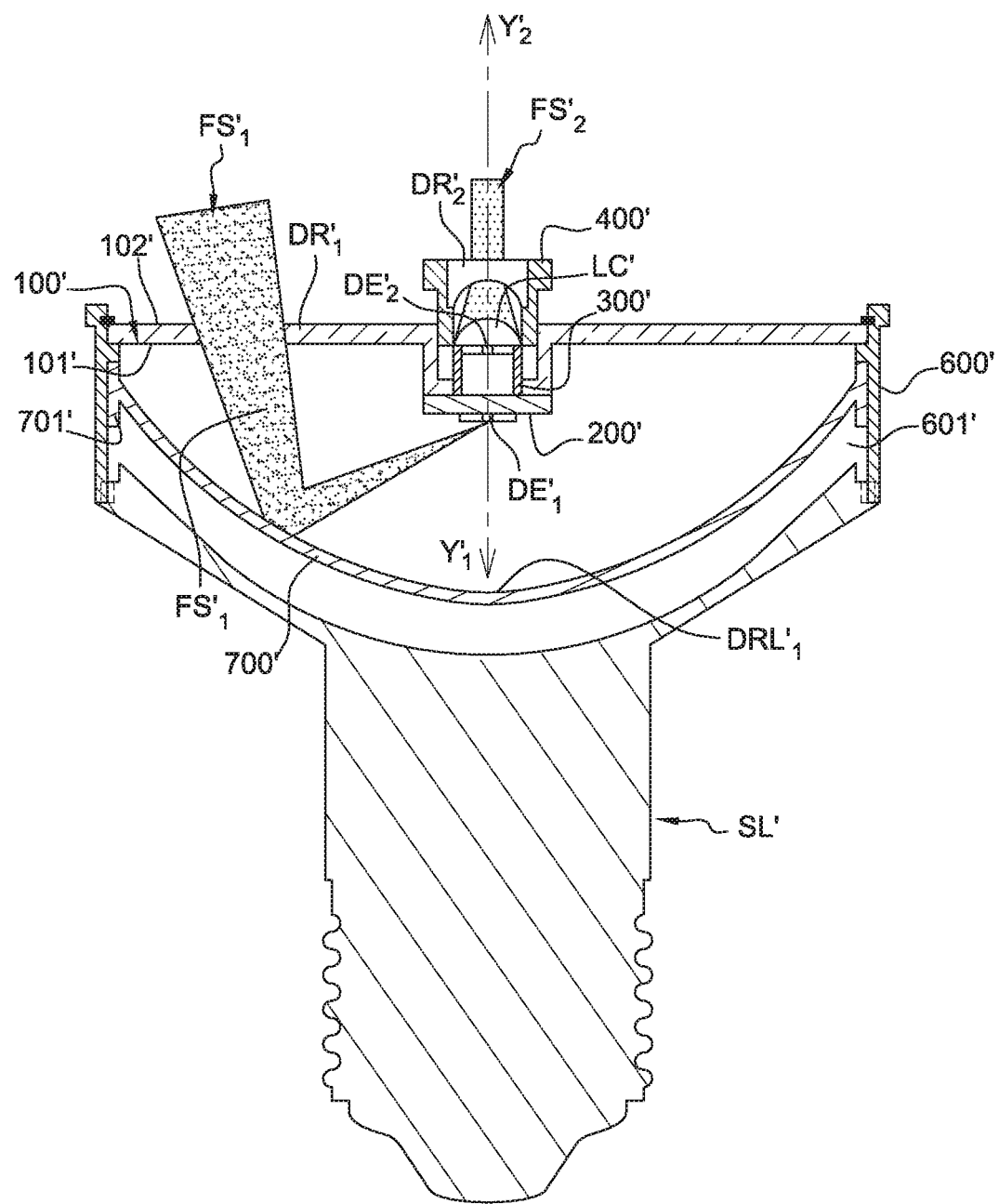
FIG. 7 shows a sectional view of a lighting device according to a second embodiment of the invention, in which the details of an assembly of various optical and lighting elements making up the lighting device are illustrated, in which optical elements are in a second operating position.

According to one particular embodiment, the refractor device $DR'_2$ is translationally movable along the axis $Y'_2$ that is perpendicular to the plate 100'. To this end, in the example shown, the refractor device $DR'_2$ is inserted into a tube 400' that is mounted in the center of the plate 100' by screwing. As shown in FIG. 7, which uses the same references as in FIG. 6, it is thus possible to vary the distance between the convergent lens LC' on the one hand and the optical refractor device $DR'_2$ so as to modify the characteristics of the light beam emitted by the light-emitting diode $DE'_2$. Thus, the further the tube 400' is moved along the axis $Y'_2$, the effect of which is to move the optical refractor device $DR'_2$ away from the convergent lens LC', the narrower the light beam FS'$_2$ from the light-emitting diode DE'$_2$ becomes.

According to the invention, a reflector device DRL'$_1$ is arranged in front of the light-emitting diode DE'$_1$ for providing illumination. As shown in detail in FIGS. 9A and 9B, such a reflector device DRL'$_1$ is a facet consisting of a reflective material, for example made of a plastic material. The deflector device DRL'$_1$ belongs to a set 700' of reflector devices DRL'$_1$, only some of which are marked in FIGS. 9A and 9B for the sake of clarity. The reflector devices DRL'$_1$ are arranged with respect to one another so as to conform to the indirect light scattering zone for the light emitted by the light-emitting diode DE'$_1$.

According to one particular embodiment, the set of reflector devices DRL'$_1$ is a parabolic mirror made of silvered plastic material. The mirror is arranged so as to form a paraboloid of revolution with respect to which the one or more light sources DE'$_1$ are relatively close to the focal point.

Figure 9A:
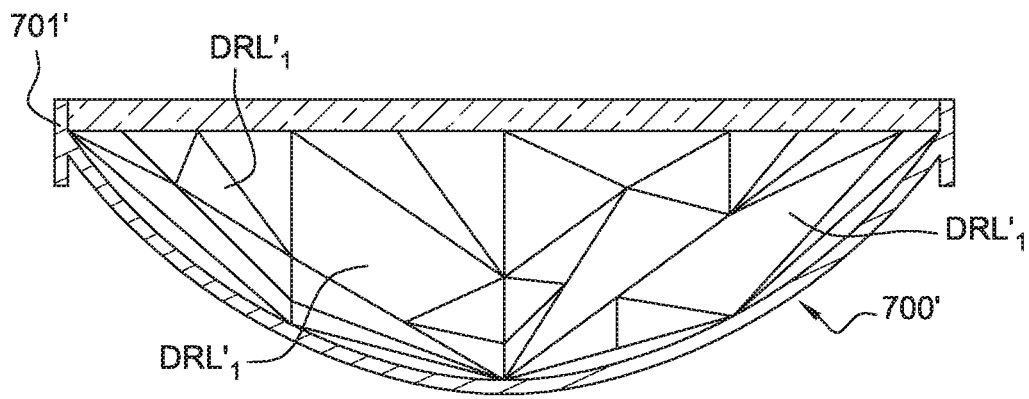
FIGS. 9A and 9B show, respectively, a sectional view and a view from above of an optical reflector device belonging to the lighting device according to the second embodiment.
Figure 9B:
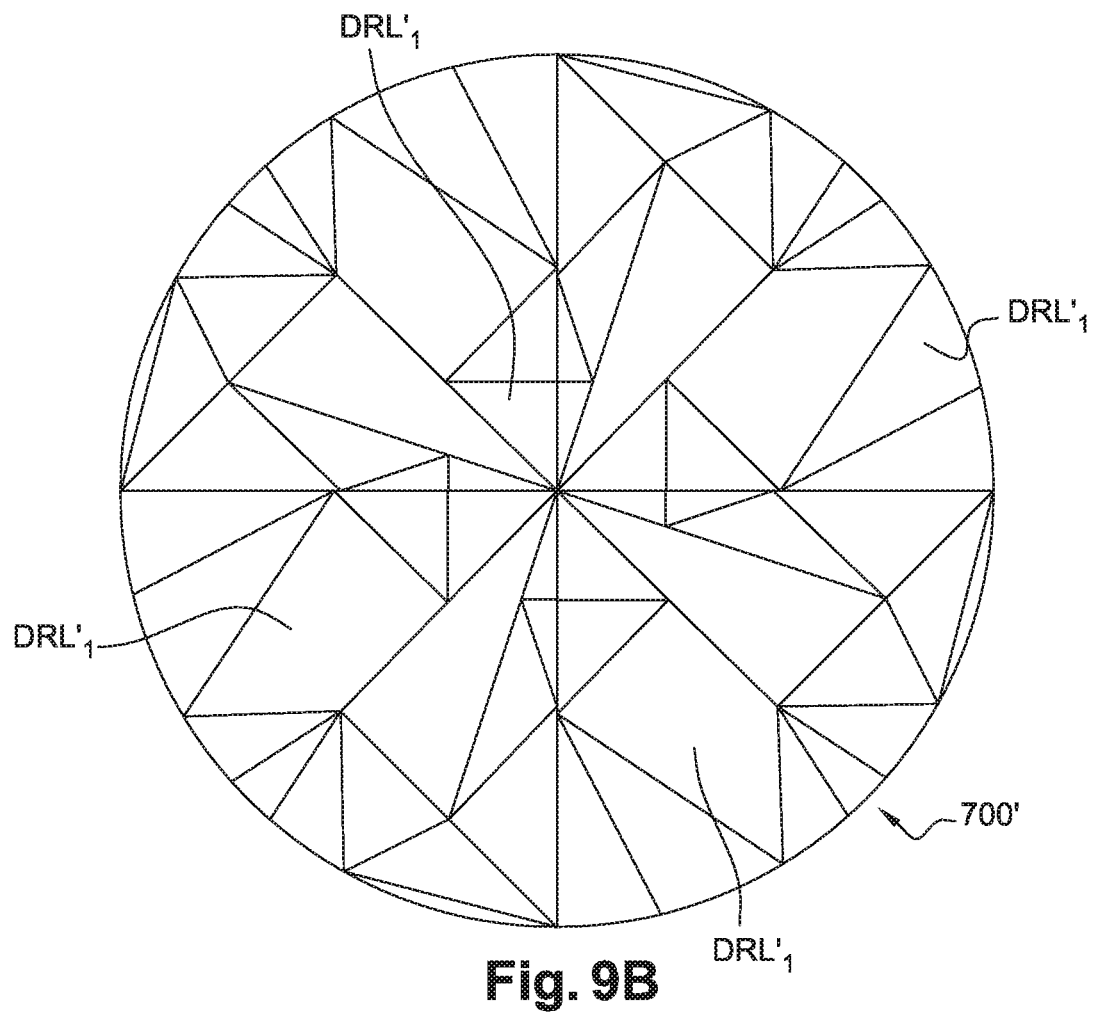

According to a first variant (not shown), each of these reflector devices DRL'$_1$ is different in shape. According to a second variant such as shown in FIGS. 9A and 9B, various subsets of these reflector devices DRL'$_1$ take a particular shape which varies from one subset to the next.

According to one particular embodiment, the set 400' of reflector devices DRL'$_1$ is translationally movable along the axis Y'$_2$ that is perpendicular to the plate 100'. To this end, in the example shown in FIGS. 6, 7, 9A and 9B, the set 700' of reflector devices DRL'$_1$ is provided with a rim 701' suitable for being slid into a throat 601' formed in the housing 600' of the lighting device. As shown in FIG. 7, which uses the same references as in FIG. 6, it is thus possible to vary the distance between the light-emitting diode DE'$_1$ for providing illumination and the set 700' of reflector devices DRL'$_1$ so as to modify the characteristics of the light beam emitted by the light-emitting diode DE'$_1$. Thus, the further the set 700' of reflector devices DRL'$_1$ is moved along the axis Y'$_2$, the effect of which is to move the set 700' closer to the light-emitting diode DE'$_1$, the wider the beam angle of the light beam FS'$_1$ emitted by the light-emitting diode DE'$_1$ then reflected by a reflector device DRL'$_1$ becomes.

The lighting device according to the second embodiment further comprises an optical refractor device DR'$_1$ that is placed in the path of the light beam FS'$_1$ reflected by the set 700' of reflector devices DRL'$_1$. The refractor device DR'$_1$ is arranged so as to scatter at least one light beam FS'$_1$ concentrated around the light beam FS'$_2$ emitted by the one or more light sources for transmitting data, the beam angle of the light beam FS'$_1$ differing from that of the light beam FS'$_2$.

According to one particular embodiment, such an optical refractor device DR'$_1$ is formed by the plate 100' so as to optimize the compactness of the assembly of optical and lighting elements of the lighting device according to the second embodiment.

In this way, it is possible to obtain two concentric beams having different characteristics at the output of the lighting device. In particular:
- as shown in FIG. 6, the lighting device allows both a narrow beam from the light sources for providing illumination only and a wider beam from the light sources for data transmission to be produced; or else
- as shown in FIG. 7, the lighting device allows a wide beam from the light sources for providing illumination only and a narrower beam from the light sources for data transmission to be produced simultaneously.

According to one particular embodiment, the lighting device according to the second embodiment includes an adjusting mechanism that is suitable for applying a translational movement along the axis Y'$_2$ that is perpendicular to the plate 100' to the set 700' of reflector devices DRL'$_1$.

One nonlimiting example of such an adjusting mechanism is illustrated in FIG. 8 and marked by the reference 500'. The adjusting mechanism 500' allows a user to adjust the position of the set 700' of reflector devices DRL'$_1$ with respect to the plate 100' while keeping the light-emitting diodes DE'$_1$, DE'$_2$ and the convergent lens LC' associated with the diode DE'$_2$ aligned.

The adjusting mechanism 500' comprises for example a grip rod that is rigidly connected to the element 700' and capable of sliding into an oblong-shaped void EV', formed in the element 700', so as to allow the element 700' to move along a trajectory that is perpendicular to the plate 100'.

By virtue of the adjusting mechanism 500' and the threaded tube 400' in which the optical refractor device DR'$_2$ associated with the light-emitting diode DE'$_2$ is mounted, the beams emitted by the lighting device may thus be modified by a user so as to obtain an illumination beam providing a wider or narrower beam angle and a more or less uniform distribution of the illuminated field. Thus, more or less contrast in the interplay of light and shadow produced by the lighting device according to the invention is advantageously obtained.

By virtue of the assembly described above in conjunction with FIGS. 6, 7, 8, 9A and 9B and the particular configuration of the refractor devices DR'$_1$ and DR'$_2$, as well as the set 700' of reflector devices DRL'$_1$, as shown in FIGS. 10A to 10C, the lighting device according to the second embodiment makes it possible to produce:
- at least one first, central beam FS'$_2$, represented by a solid line, said beam FS'$_2$ being capable of data transmission and having a narrow beam angle;
- a plurality of second, peripheral beams FS'$_1$, represented by dashed lines, each beam FS'$_1$ being concentrated around said first, central beam FS'$_2$ and being for providing illumination only, some of said second beams each having a beam angle that is wider than that of the first beam FS'$_2$ and some others of said second beams each having a beam angle that is similar or equal to that of the first beam FS'$_2$.

The effect produced by the interference between the various beams FS'$_1$ is the creation of an interplay of light and shadow thus allowing satisfactory ambient illumination to be obtained while guaranteeing optimum data transfer toward a specific site.

In the example shown in FIGS. 10A to 10C, the lighting device according to the second embodiment comprises three light-emitting diodes DE'$_1$ for providing illumination and a single light-emitting diode DE'$_2$ for data transmission.

Interplays of light and shadow having different characteristics may be produced according to whether the light-emitting diodes DE'$_1$ are all lit or only one and/or another of these diodes is lit.

FIG. 10A shows a first type of interplay of light and shadow when only one diode DE'$_1$ out of three is lit.

FIG. 10B shows a second type of interplay of light and shadow when only one other diode DE'$_1$ out of three is lit.

FIG. 10C shows a third type of interplay of light and shadow when only one other diode DE'$_1$ still out of three is lit.

The lighting device described above may be used particularly advantageously in the case of illuminating a product in a shop. The device may then be configured to produce a first illumination beam focused on the product and a second, wider beam for transmitting data. The illumination beam thus allows a product to be shown to advantage on a display stand while the wider data beam allows information relating to the product to be transmitted within a configurable perimeter around the product.

In a different context, the lighting device described above may be configured so as to provide a wide illumination beam and a narrow data transmission beam. This configuration is suitable for example for office lighting in an open space, providing both ambient illumination and data transmission in a restricted zone.

It goes without saying that the embodiments described above have been provided purely by way of completely nonlimiting indication, and that numerous modifications may be easily made by a person skilled in the art without otherwise departing from the scope of the invention.

The invention claimed is:

1. A lighting device, comprising:
   a first fixed light source configured to provide illumination;
   a second light source configured to transmit data by modulating the light;
   first and second optical refractor devices positioned, respectively, with respect to the first and second light sources so as to capture the light emitted by the first and second light sources and to form, respectively, distinct first and second light beams, the second light beam defining a data transmission zone suitable for the transmission of data; and
   a variator device configured to vary the luminosity and/or the color of the first light beam, said variator device configured to be:
     activated to identify the availability of a data transmission service provided in the data transmission zone by varying the luminosity and/or the color of the first light beam to produce various light effects affecting the illumination of the data transmission zone defined by the second light beam, and
     deactivated when the data transmission service provided in the data transmission zone is not available.

2. The device of claim 1, wherein the variator device is deactivated upon the establishment of a communication session, by a communication terminal, in the data transmission zone, and activated, respectively, at the end of the communication session.

3. The device of claim 1, wherein the variator device is deactivated when a number of communication sessions in the data transmission zone is equal to a predetermined threshold, and activated, respectively, when a number of communication sessions in the data transmission zone is lower than the predetermined threshold.

4. The device of claim 1, wherein the variator device is deactivated when the data transmission service in the data transmission zone is unavailable, and activated, respectively, when the data transmission service is made available.

5. The device of claim 1, further comprising a driver device configured to drive the variator device, wherein the driver device is configured to adjust one or more luminosity and/or color variation parameters applied by the variator device.

6. The device of claim 1, comprising a plate that includes a central zone and a peripheral zone, wherein:
   the first light source and at least one other first light source constitute a first set of light sources that is arranged in the central zone;
   the second light source and at least one other second light source constitute a second set of light sources that is arranged in the peripheral zone,
   the first light sources of the first set of light sources configured to provide illumination and the second light sources of the second configured to transmit data by modulating the light, the variator device configured to vary the luminosity and/or the color of the one or more first light beams emitted by the first set of light sources, wherein the device further comprises:
   at least two first optical refractor devices which are positioned respectively in front of each of the first light source and the at least one other first light source; and
   at least two second optical refractor devices which are positioned respectively in front of each of the second light source and the at least one other second light source.

7. The device of claim 6, wherein the at least two first refractor devices and the at least two second refractor devices are of different types.

8. The device of claim 1, comprising a plate having mounted thereon:
   the second light source for transmitting data by modulating the light, in front of which the optical refractor device is positioned, the scattering axis of the light emitted by the second source being oriented toward the exterior of the lighting device;
   the first light source for providing illumination, in front of which an optical reflector device is positioned, the scattering axis of the light emitted by the light source being oriented in the opposite direction with respect to the scattering axis of the light emitted by the second light source.

9. The device of claim 8, wherein the first optical refractor device is placed in a path of at least one light ray reflected by the optical reflector device.

10. The device of claim 8, wherein the plate of the device comprises the reflector device positioned in front of the first light source for providing illumination.

* * * * *